United States Patent [19]
Coffer et al.

[11] Patent Number: 6,076,880
[45] Date of Patent: Jun. 20, 2000

[54] VEHICULAR SEAT SYSTEM AND METHOD OF FOLDING

[75] Inventors: Ian J. Coffer, Ferndale; Paul S. Severinski, Southgate, both of Mich.; Christopher G. Durham, Windsor, Canada; Donald H. Bernhardt, Walled Lake, Mich.; Mark E. Rodgers, Washington, Mich.; Michael David Kolosick, Roseville, Mich.

[73] Assignee: Lear Automotive Dearborn, Inc, Southfield, Mich.

[21] Appl. No.: 09/054,730

[22] Filed: Apr. 3, 1998

[51] Int. Cl.[7] ...................................................... B60N 2/02
[52] U.S. Cl. .................................... 296/65.09; 296/65.01; 296/65.05; 296/65.09; 296/65.16
[58] Field of Search ............................. 296/63, 64, 65.01, 296/65.03, 65.05, 65.06, 65.09, 65.13, 65.16, 37.15, 37.1, 37.8

[56] References Cited

U.S. PATENT DOCUMENTS

| | | |
|---|---|---|
| Re. 29,271 | 6/1977 | Barecki .................................. 296/63 X |
| 4,382,629 | 5/1983 | Froumajou . |
| 4,568,107 | 2/1986 | Biviano .................................... 297/468 |
| 4,637,648 | 1/1987 | Okino et al. .............................. 296/63 |
| 4,700,989 | 10/1987 | Ercilla . |
| 4,832,241 | 5/1989 | Radcliffe ........................... 296/37.15 X |
| 4,888,854 | 12/1989 | Russell et al. . |
| 4,932,709 | 6/1990 | Wainwright .............................. 296/65.1 |
| 5,038,437 | 8/1991 | Russell et al. . |
| 5,133,589 | 7/1992 | Kimura . |
| 5,273,336 | 12/1993 | Schubring et al. ...................... 296/65.1 |
| 5,482,349 | 1/1996 | Richter et al. ...................... 296/65.1 X |
| 5,547,242 | 8/1996 | Dukatz et al. . |
| 5,558,386 | 9/1996 | Tilly et al. . |
| 5,570,931 | 11/1996 | Kargilis et al. . |
| 5,582,453 | 12/1996 | Leuchtmann et al. . |
| 5,628,543 | 5/1997 | Filipovich et al. ..................... 296/37.1 |
| 5,632,520 | 5/1997 | Butz ................................. 296/37.16 X |
| 5,662,367 | 9/1997 | Rastetter et al. . |
| 5,662,377 | 9/1997 | Holdampf et al. . |
| 5,716,091 | 2/1998 | Wieczorek ........................... 296/37.16 |
| 5,741,046 | 4/1998 | Leuchtmann et al. ............. 296/65.1 X |
| 5,871,255 | 2/1999 | Harland et al. ..................... 296/65.1 X |
| 5,902,009 | 5/1999 | Singh et al. ...................... 296/65.05 X |
| 5,941,591 | 8/1999 | Tsuge et al. ......................... 296/65.09 |

FOREIGN PATENT DOCUMENTS

| | | |
|---|---|---|
| 0 749 864 | 12/1996 | European Pat. Off. . |
| 96/38318 | 12/1996 | WIPO . |
| 97/41001 | 11/1997 | WIPO . |

*Primary Examiner*—D. Glenn Dayoan
*Assistant Examiner*—Lori L. Coletta
*Attorney, Agent, or Firm*—MacMillan, Sobanski & Todd, LLC; A. Michael Tucker

[57] ABSTRACT

A seat system for a passenger vehicle includes a foldable rear seat and a foldable front seat. The rear seat includes a removable seat bottom and a forwardly folding seat back. An approximately horizontal rear support surface is formed by a surface of the rear seat back when the rear seat back is folded forward. The front seat includes a seat bottom and a forwardly folding seat back. An approximately horizontal front support surface is formed by a surface of the front seat back when the front seat back is folded forward. An extended support surface is formed by the rear support surface and the front support surface. If desired, the front seat can be mounted on a track assembly so that the front and rear support surfaces can be placed in close proximity to each other. If desired, a workstation can be formed in the front support surface.

20 Claims, 9 Drawing Sheets

VEHICULAR SEAT SYSTEM AND METHOD OF FOLDING

BACKGROUND OF THE INVENTION

This invention relates in general to seat systems for passenger vehicles, and in particular is concerned with a seat system that can be folded to provide a support surface extending from a trunk compartment to a front seat.

A common seat system for a passenger compartment of an automobile includes a front driver bucket seat, a front passenger bucket seat, and a rear passenger bench seat. Each of the bucket seats includes a seat bottom and a seat back. A seat back is hinged to a seat bottom and can be pivoted forward to allow access to the rear bench seat. Oftentimes, the seat back pivots forward approximately forty-five degrees from a generally vertical support position. The seat bottom can be mounted on a track assembly to permit a seat to be adjusted along a longitudinal axis of the automobile for comfort of an occupant and access to the rear seat.

A common rear bench seat includes a seat bottom spanning a desired width of the automobile and a seat back spanning a similar width. The seat bottom is usually fixed relative to a floor of the passenger compartment. A rear surface of the seat back oftentimes forms a wall of a trunk compartment. To provide convenient storage of long items (such as skis, lumber, etc.) forward folding rear seat backs have been provided. In certain vehicles, the rear seat back has been formed into two separate panels, one or both of which can be folded forward. A common split seat back is formed into a first panel having approximately one-third of a width of the total rear seat back and a second panel having approximately two-thirds of a width of the total rear seat back. In other rear seat backs, a center panel has been provided to provide access to the trunk compartment.

It is desirable to provide a seat arrangement in a passenger vehicle that can support items extending from a trunk compartment into a passenger compartment. Furthermore, it is desirable to provide a seat arrangement that can provide desirable workspace for occupants of the passenger compartment.

SUMMARY OF THE INVENTION

This invention includes a seat system for a vehicle. The seat system includes a rear back seat having a removable seat bottom that can be pivoted forward to provide access to a storage compartment. The rear seat also includes a seat back that can be pivoted forward to provide an approximately horizontal rear support surface for items extending from a trunk compartment. The seat system also includes a front passenger seat having a seat back hinged to a seat bottom. The front seat back can be pivoted forward to provide an approximately horizontal front support surface. When the rear seat bottom is removed, an approximately horizontal extended support surface is formed by the rear support surface and the front support surface. The extended support surface is preferably aligned with a trunk support surface of the trunk compartment.

In a preferred embodiment, a seat system for a passenger vehicle includes a foldable rear seat and a foldable front seat. The rear seat includes a removable seat bottom and a forwardly folding seat back. An approximately horizontal rear support surface is formed by a surface of the rear seat back when the rear seat back is folded forward. The front seat includes a seat bottom and a forwardly folding seat back. An approximately horizontal front support surface is formed by a surface of the seat back when the front seat back is folded forward. An extended support surface is formed by the rear support surface and the front support surface. If desired, the front seat can be mounted on a track assembly so that the front and rear support surfaces can be placed in close proximity to each other. If desired, a workstation can be formed in the front support surface.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
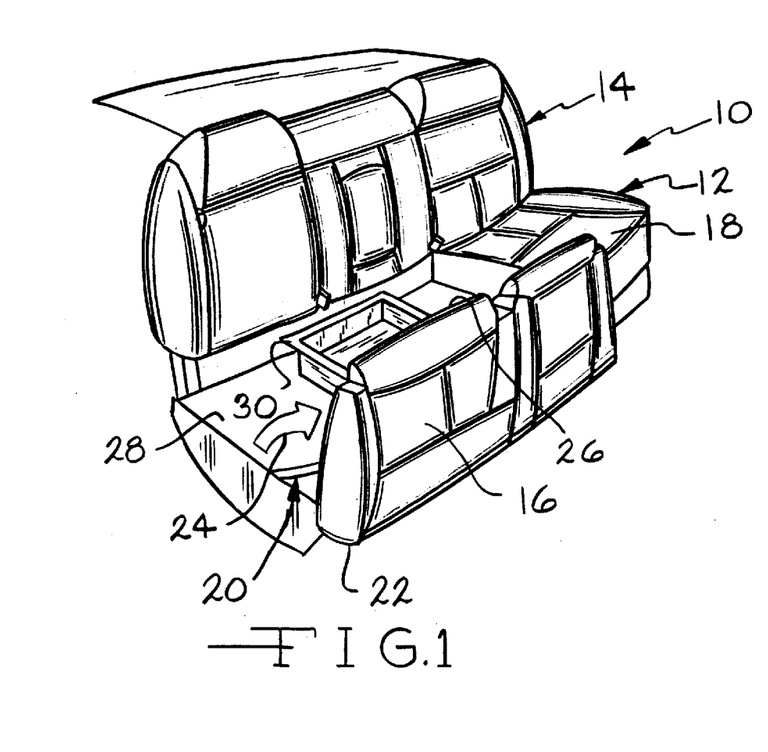
FIG. 1 is a perspective view of a vehicular rear seat according to this invention illustrating a first portion of a rear seat bottom pivoted forward to permit access to a storage compartment.

A vehicular rear seat according to this invention is indicated generally at 10 in FIG. 1. The rear seat 10 includes a rear seat bottom 12 and a rear seat back 14. The seat bottom 12 can be divided into a first portion 16 and a second portion 18 as illustrated. In other embodiments, the seat bottom 12 can be formed as a single element or into more than two portions. Each of the portions 16 and 18 includes a frame (not illustrated in FIG. 1) supporting a cushion covered by a desired material.

The first portion 16 includes a linkage mechanism 20 that permits the first portion 16 to be folded or pivoted forwardly along a lower front edge 22. A rear edge 24 of the first portion 16 is rotated or positioned upwardly as indicated by arrow 26 as the front edge 22 pivots about the linkage mechanism 20. When the first portion 16 is placed in the upright position illustrated in FIG. 1, a storage compartment 28 formed beneath the first portion 16 is accessible. If desired, the storage compartment 28 can include a tray 30. If desired, the tray 30 can be removed from the storage compartment 28.

Figure 5:
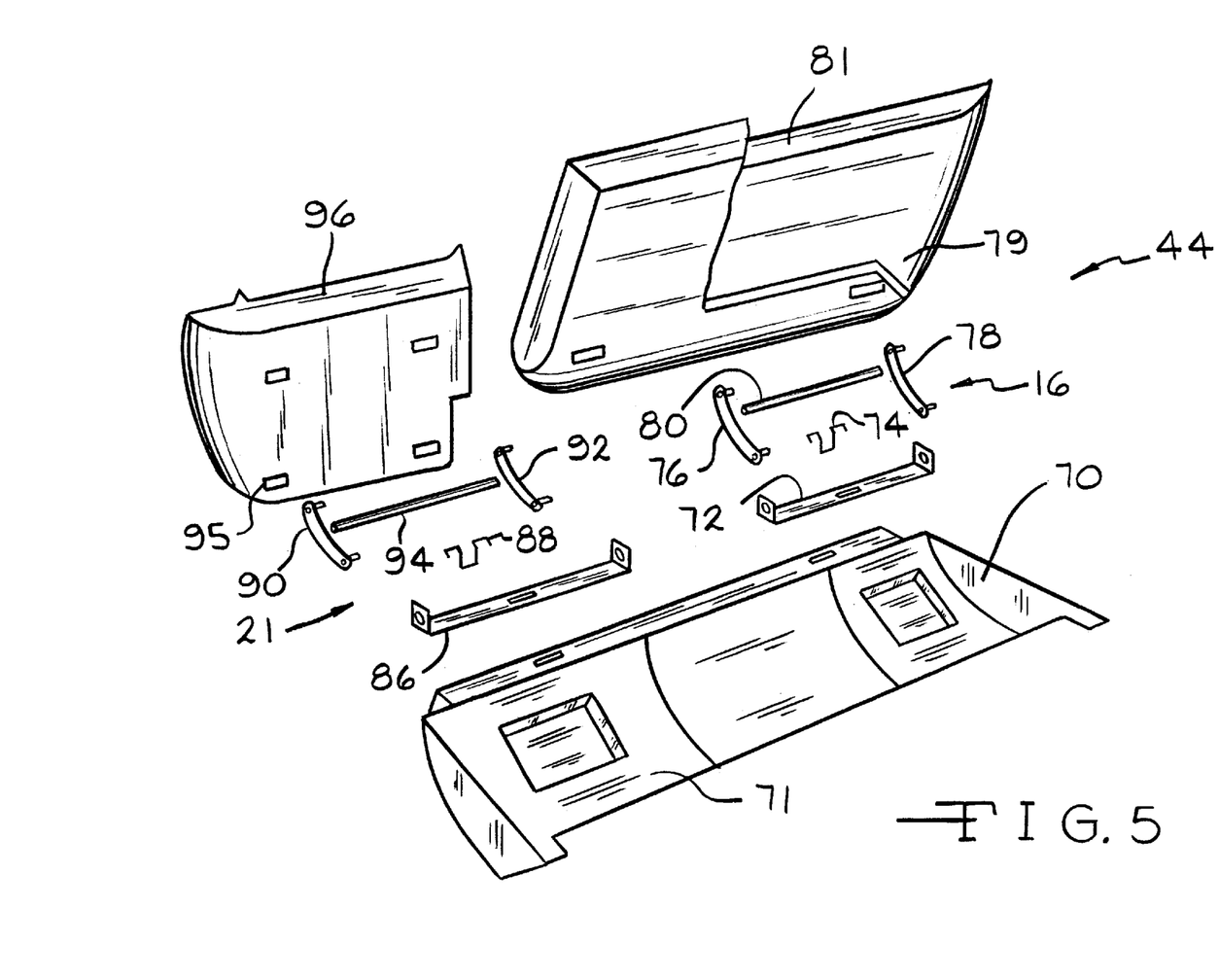
FIG. 5 is an exploded perspective view of a seat bottom frame assembly removed from the seat back frame assembly of FIG. 3.

In a similar manner, the second portion 18 can include a linkage mechanism 21 (see FIG. 5) so that the second portion 18 can be rotated into an upright position and aligned with the upright position of the first portion 16.

Figure 2:
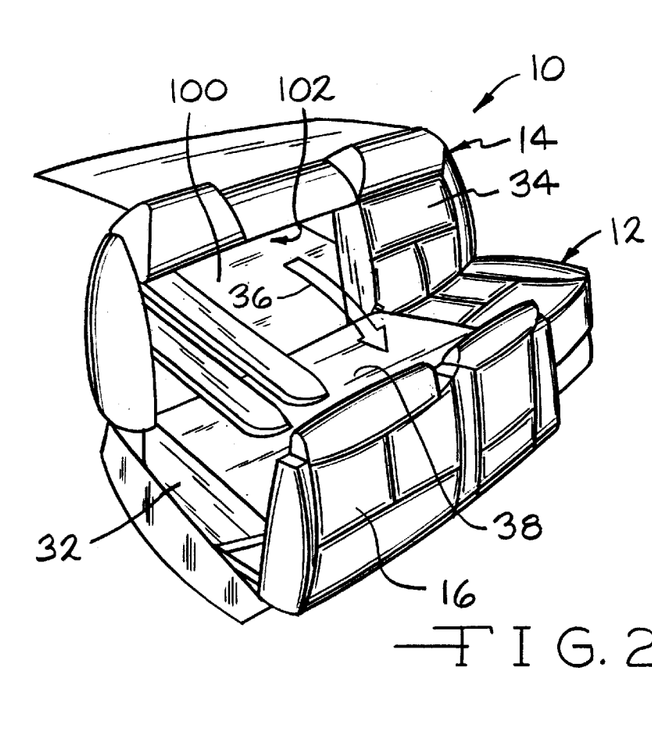
FIG. 2 is a perspective view of the vehicular rear seat of FIG. 1 wherein a first panel of a rear seat back is pivoted forward to provide a rear support surface approximately level with a trunk support surface of a trunk compartment.

As illustrated best in FIG. 2, the rear seat back 14 can be divided into a first panel 32 and a second panel 34. Each of the panels 32 and 34 can include frames (see FIGS. 3 and 4) supporting cushions and covered by desired materials. Each panel 32 and 34 can be pivotally mounted on a rear seat frame (see FIGS. 3 and 4), preferably along respective lower edges. When panel 32 is pivoted forward as indicated by arrow 36, a rear support surface 38 is provided by a rear surface of the panel 32. Preferably, the rear support surface 38 is approximately horizontal and approximately level with an approximately horizontal trunk support surface 100 of a trunk compartment 102. The phrase "approximately level with" as used in this specification is intended to include adjacent surfaces that cooperate with each other to provide a support surface for items. The relationship of the adjacent surfaces is such that one surface can be inclined, and/or one surface can be at a different height with respect to the other adjacent surface. However, the adjacent surfaces are relatively aligned so that items can be supported on both surfaces. Relatively minor differences can exist between the heights of the support surfaces.

The thickness (the dimension between forward and rear surfaces) of the panel 32 is received into the storage compartment 28 when the panel 32 is fully pivoted, thereby positioning the rear support surface 38 at an approximate same level with the trunk support surface 100.

In a similar manner, the second panel 34 can include a hinge mechanism (not illustrated) so that the second panel 34 can be pivoted to a folded position to provide additional rear support surface 38.

The rear seat 10 can be constructed with a seat bottom 12 and a seat back 14 having portions and panels of various widths. In certain embodiments, all portions of the seat bottom 12 and all panels of the seat back 14 can pivot as described above. In other embodiments, only certain portions of the seat bottom 12 and certain panels of the seat back 14 can be constructed so as to pivot as described above.

Figure 3:
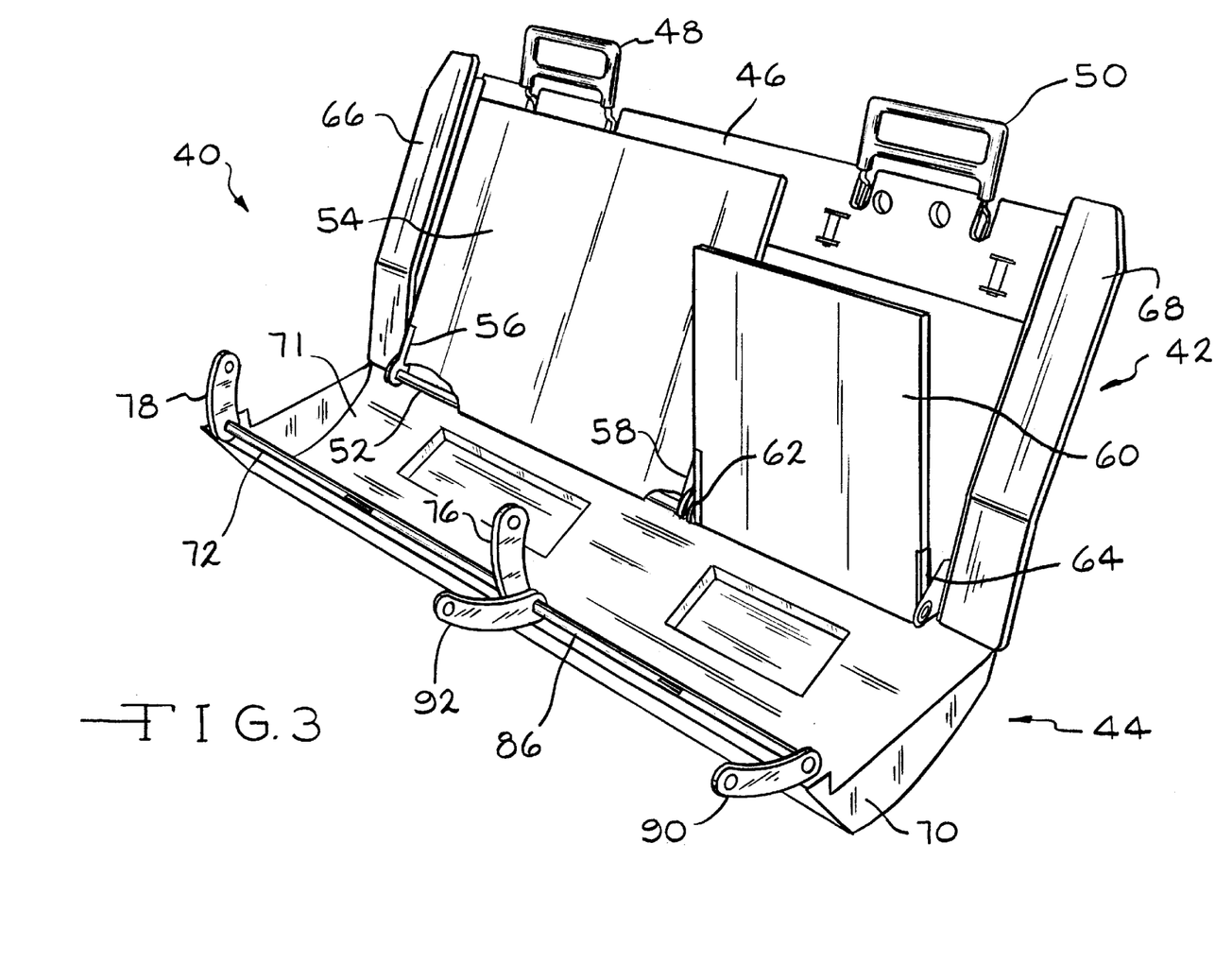
FIG. 3 is a perspective view of a frame assembly for the rear seat of FIGS. 1 and 2 illustrating a base section of a second panel of the rear back seat partially pivoted forward.
Figure 4:
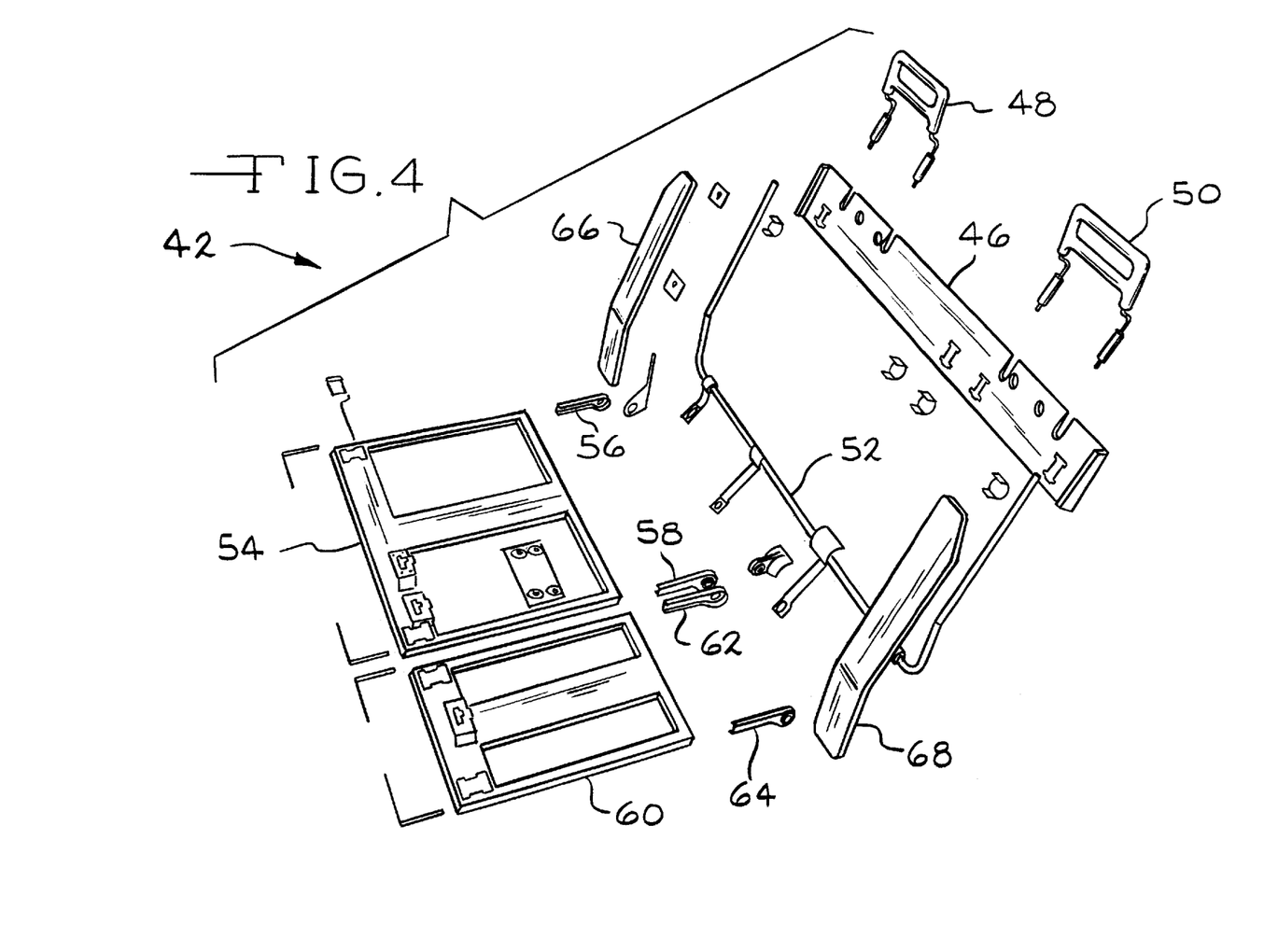
FIG. 4 is an exploded perspective view of a seat back frame assembly removed from the seat bottom frame assembly of FIG. 3.

A preferred frame assembly 40 for the rear seat 10 is illustrated in FIG. 3. A preferred frame assembly 42 for the rear seat back 14 is illustrated in FIG. 3 and also in the exploded perspective view of FIG. 4. A preferred frame assembly 44 for the rear seat bottom 12 is illustrated in FIG. 3 and also in the exploded perspective view of FIG. 5.

The frame assembly 42 includes a head panel 46 spanning a width of the rear seat back 14. The head panel 46 is attached to a predetermined body surface in a passenger compartment of a vehicle. A first headrest frame 48 and a second headrest fame 50 are attached to the head panel 46. A U-shaped tube 52 is attached to body surface. The headframe 46 and the tube 52 cooperate to frame an opening into the trunk compartment 102 when a panel 32 or 34 is folded forward as described above. The first panel 32 includes a base section 54 that is pivotally attached along a lower edge to the tube 52 by yokes 56 and 58. The second panel 34 includes a base section 60 that is pivotally attached along a lower edge to the tube 52 by yokes 62 and 64.

Preferably, a first bolster 66 and a second bolster 68 are connected to the opposite sides of the frame assembly 42. The bolsters 66 and 68 can be covered by cushions and covers to match panels 32 and 34. Latches and other hardware can be used with the frame assembly 42 to provide attachments and connections as desired.

The frame assembly 44 includes a shell 70 that is attached to a floor of a passenger compartment. The shell 70 can be formed from any desired material including a lightweight, moldable material. Preferably, the shell 70 includes a concave cavity 71 that forms the storage compartment 28. A first linkage mechanism 20 pivotally attaches the first portion 16 to the shell 70. The first linkage mechanism 16 includes an attachment bar 72 secured to the shell 70. A wire 74 is received through corresponding slots in the attachment bar 72 and the shell 70. First and second links 76 and 78 provide dual pivots for the first portion 16. At one end, each link 76 and 78 is pivotally connected to the attachment bar 72. At an opposite end, each link 76 and 78 is pivotally connected to a bracket 79 mounted on the first portion 16. A reinforcement bar 80 is connected between links 76 and 78.

The first portion 16 preferably includes an energy absorbing foam cushion 81. When the first portion 16 is pivoted to the upright position illustrated in FIG. 2, foam cushion 81 acts as an energy absorbing barrier between items supported on the rear support surface 38 and a front seat. When the first portion 16 is folded in a seating position, the reinforcement bar 80 rest behind the attachment bar 72 and provides a resistance mechanism to retain the first portion 16 during a frontal collision.

Figure 6:
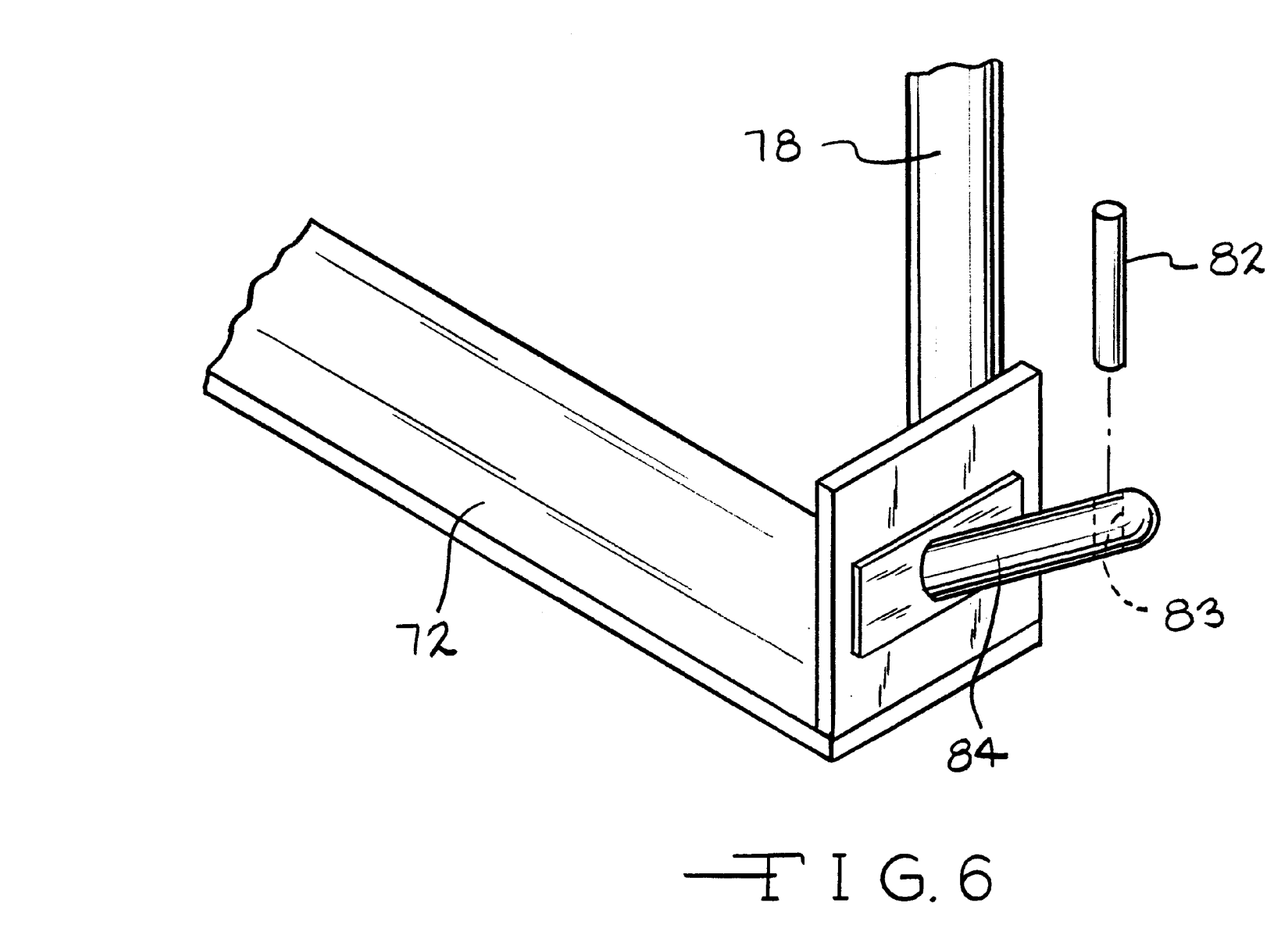
FIG. 6 is an enlarged perspective view of pin removed from a linkage assembly that removable connects a seat bottom portion to a passenger compartment.

The first portion 16 is preferably removable from the passenger compartment. As illustrated in FIG. 6, a pin 82 such as a cotter pin can be received in an opening 83 of a pivot stud 84 formed on a link 78. When the pin 82 is removed, the link 78 can be disconnected from the attachment bar 72 and the first portion 16 can be removed.

In a similar manner, the second portion is preferably removable from the passenger compartment. As illustrated best in FIG. 5, a second linkage mechanism 21 pivotally and removably connects the second portion 18 to the shell 70. The second linkage mechanism 21 includes an attachment bar 86, a 4 bar wire 88, links 90 and 92, a reinforcement bar 94, and a bracket 95. The second portion 18 includes a cushion 96.

Figure 7:
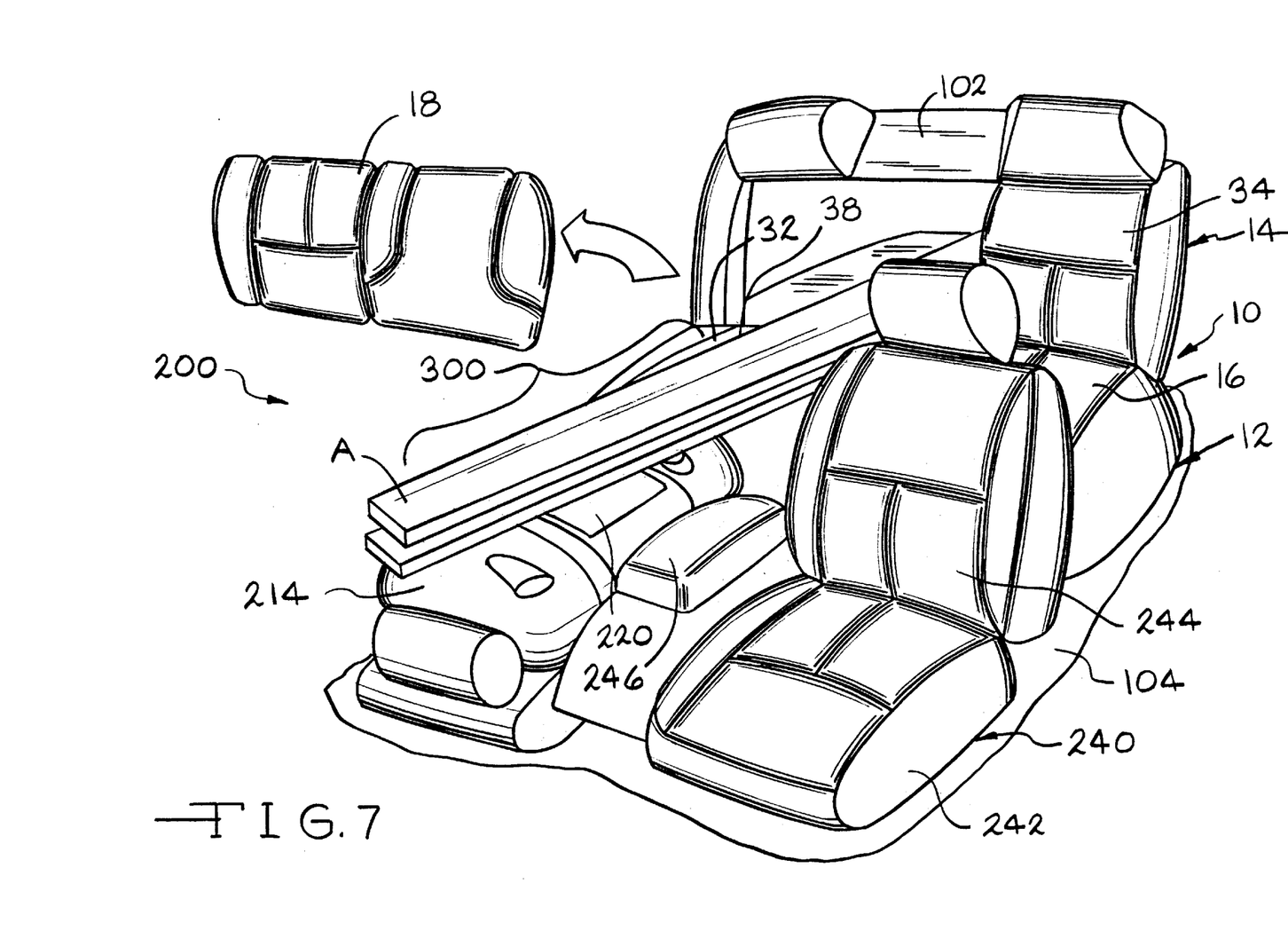
FIG. 7 is a perspective view of a vehicular seat system according to this invention illustrating a foldable front seat providing a front support surface and the foldable rear seat of FIGS. 1–6.
Figure 8:
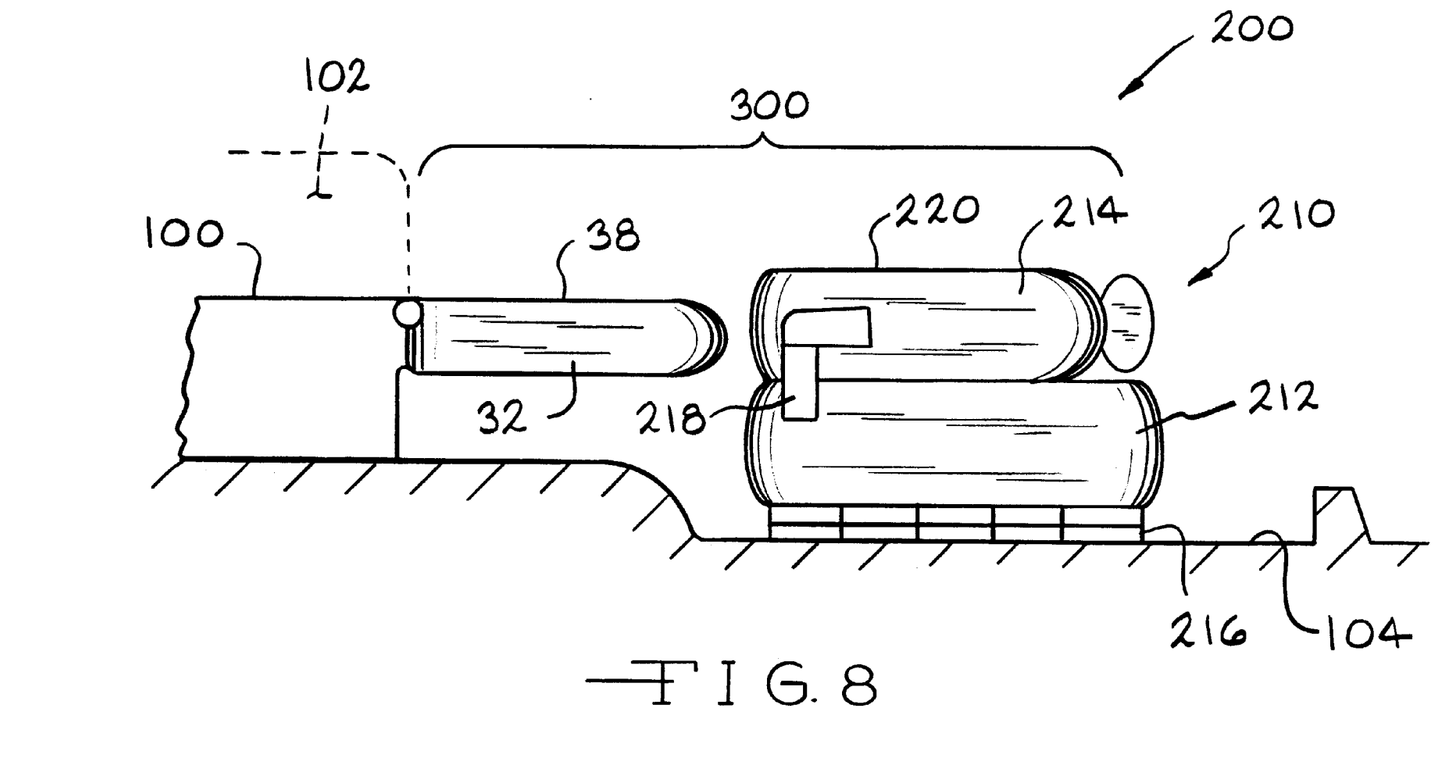
FIG. 8 is a side view of the foldable front passenger seat and the foldable rear seat of FIG. 7 illustrating an extended support surface formed in a passenger compartment by the front support surface and the rear support surface.

As illustrated in FIGS. 7 and 8, the rear seat 10 is part of a foldable seat system or arrangement 200 according to this invention. The seat system 200 includes the foldable rear seat 10 and a foldable front passenger seat 210. When the seat system 200 is folded according to this invention, the rear seat 10 and the front passenger seat 210 cooperate to provide an extended support surface 300. The extended support surface 300 is generally horizontal and is capable of supporting items extending from a trunk compartment 102 into a passenger compartment 104 and onto the front passenger seat 210.

The front passenger seat 210 includes a seat bottom 212 and a seat back 214. The seat bottom 212 is preferably mounted on a track assembly 216 to permit the seat 210 to be adjusted for comfort of the occupant and/or access to the rear seat 110. The seat bottom 212 includes a frame (not illustrated) supporting a cushion covered by a desired material. The seat back 214 includes a frame (not illustrated) supporting a cushion covered by a desired material.

The seat back 214 is pivotally connected to the seat bottom 212 by a hinge mechanism 218 so that the seat back 214 can be pivoted or folded forward. Preferably, the seat back 214 is folded forward so that a rear surface of the seat back 214 is generally horizontal and forms a front support surface 220. Preferably, the front support surface 220 is at a predetermined height so as to support items extending from the rear support surface 38 provided by the folded panel 34. The front support surface 220 and the rear support surface 38 cooperate to provide the extended support surface 300 in a passenger compartment 104. Preferably, the extended support surface 300 is approximately level with the trunk support surface 100. However, the front support surface 220 can be at a different height than that of either the rear support surface 38 or the trunk support surface 100. As shown in FIG. 7, items A stored in the trunk compartment 102 extend into the passenger compartment 104 and are supported on the generally horizontal extended support surface 300.

The seat system 200 according to this invention is preferably mounted in the passenger compartment 104 of a vehicle. The seat system 200 is preferably combined with a front driver seat 240 having a seat bottom 242 and a seat back 244. In certain embodiments, the front driver seat 240 can be constructed so that its seat back 244 folds forward until a rear surface provides an approximately horizontal support surface even with front support surface 220. A front armrest 246 can be provided between the front driver seat 240 and the front passenger seat 210.

As stated above, the front passenger seat 210 can be provided on a track assembly 216. As illustrated in FIG. 8, the track assembly 216 can be constructed so that the front passenger seat 210 can be moved rearwardly so that a rear surface of the folded seat back 214 can approximately abut a front surface of the folded panel 34. In this manner, a nearly continuous support surface is provided by close proximity of the rear support surface 38 and the front support surface 220.

Figure 9:
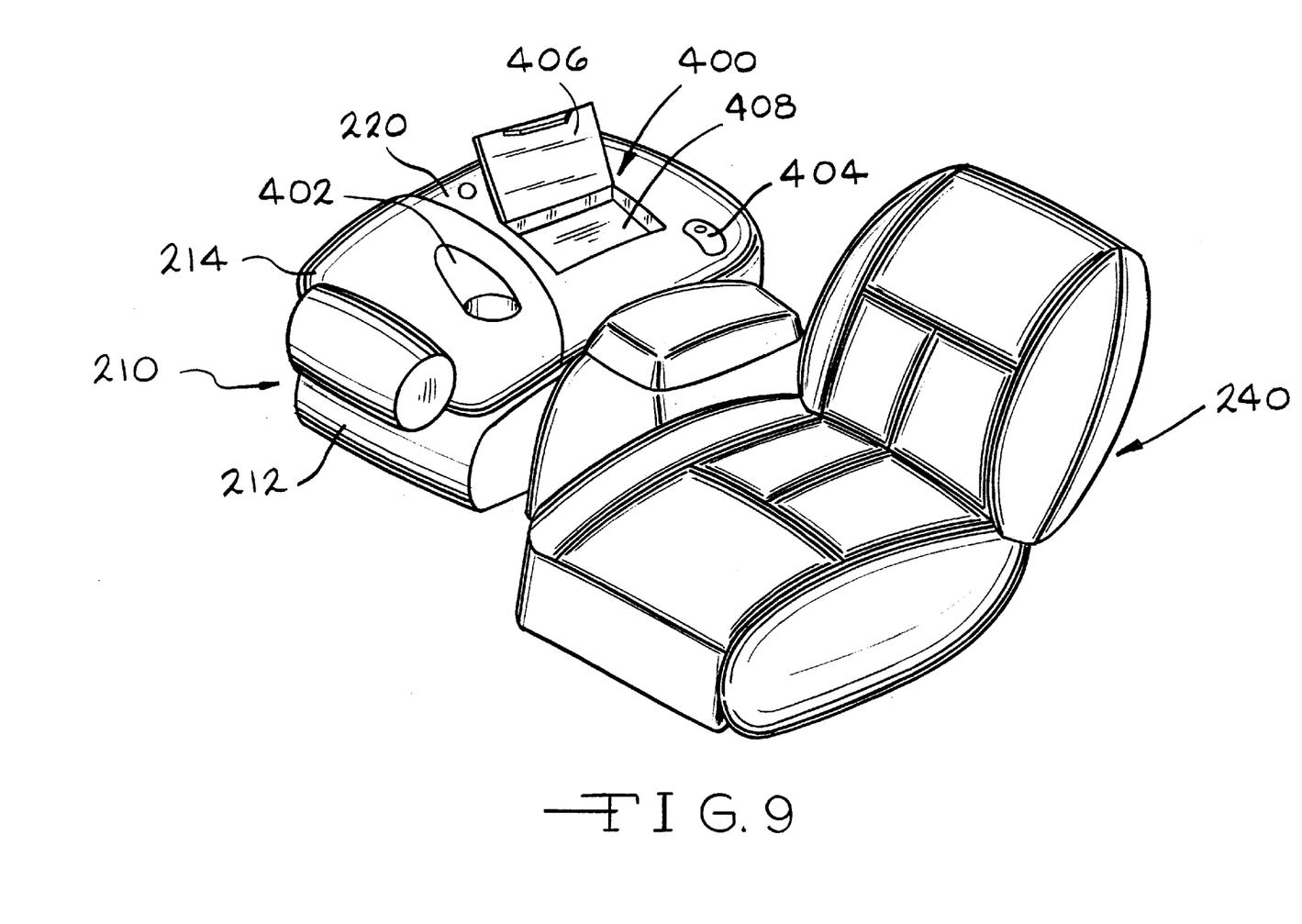
FIG. 9 is a perspective view of the foldable front passenger seat of FIGS. 3 and 4 illustrating a workstation formed on a rear surface of the front seat back oriented for use by an occupant of a front driver seat.

As illustrated best in FIG. 9, the front passenger seat 210 can include a workstation 400 oriented to accommodate use by an occupant in the driver seat 240. The workstation 400 is preferably formed in a rear surface of the seat back 214. As described above, when the seat back 214 is folded to an approximately horizontal position, its rear surface forms the front support surface 220. The workstation 400 can include a cup holder 402, an electrical outlet 404, and a flip-up support 406 to receive an item such as a notepad. An indentation 408 can be formed in the surface 220 to receive and seat an item such as a laptop computer.

Figure 10:
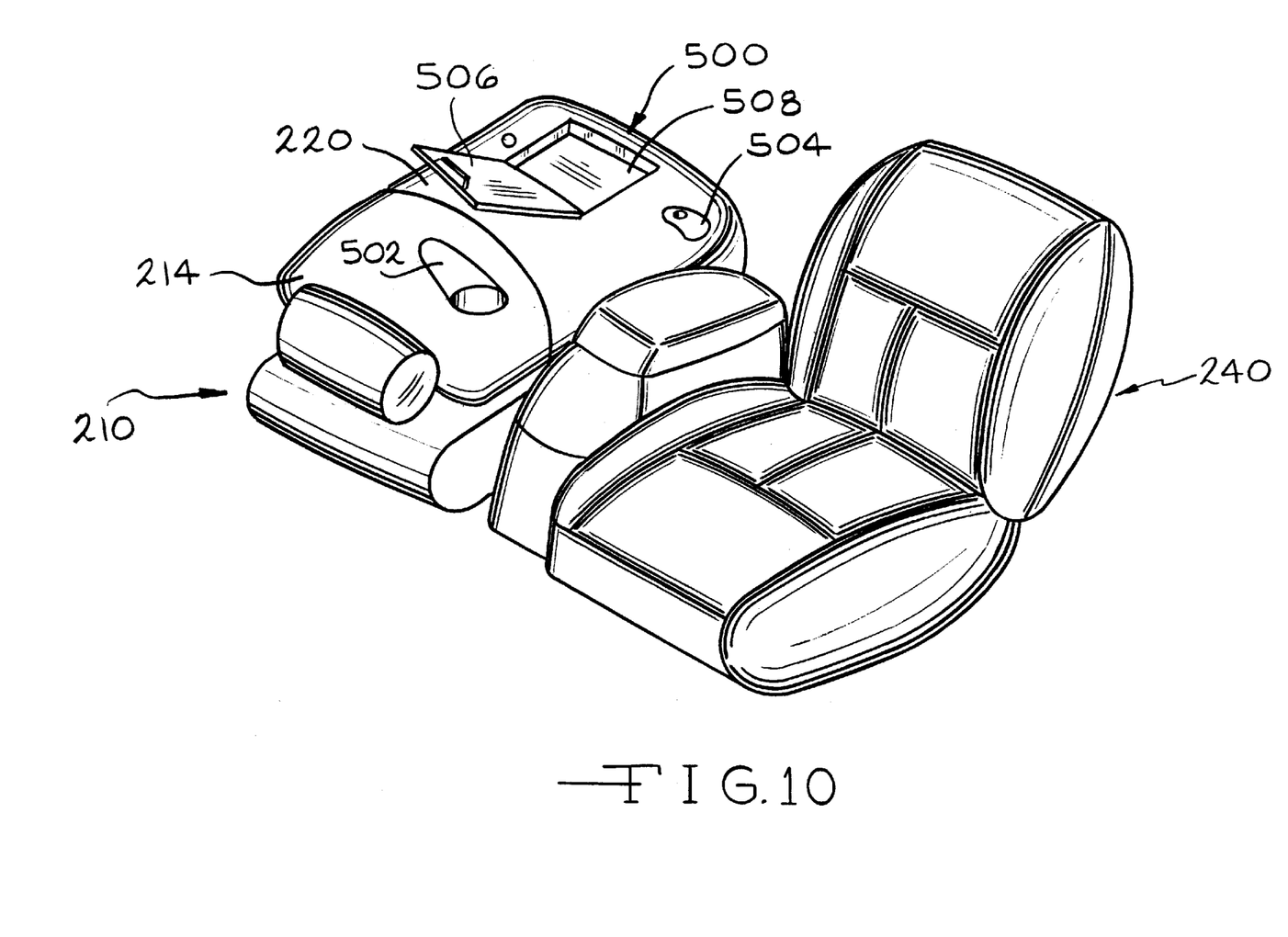
FIG. 10 is a perspective view similar to FIG. 9 illustrating an alternate workstation formed on a rear surface of the front seat back oriented for use by an occupant of the rear seat.

In an alternate embodiment illustrated in FIG. 10, the front passenger seat 210 can include a workstation 500 oriented to accommodate an occupant of the rear seat 110. The workstation 500 can include items such as a cup holder 502, an electrical outlet 504, a flip-up support 506, and an indentation 508.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A passenger vehicle comprising:
   a passenger compartment and a trunk compartment, the trunk compartment including a trunk support surface;
   a rear seat mounted in the passenger compartment adjacent the trunk compartment, the rear seat including a seat bottom and a forwardly folding seat back, the rear seat back forming a rear support surface cooperating with the trunk support surface when the rear seat back is positioned in a folded position, the rear seat back including a frame assembly having a head panel that frames an opening into the trunk compartment; and
   a front seat mounted in the passenger compartment forward of the rear seat, the front seat including a seat bottom and a forwardly folding seat back, the front seat back forming a front support surface when the front seat back is positioned in a folded position.

2. The passenger vehicle defined in claim 1 wherein the rear seat bottom is removable from the passenger compartment.

3. The passenger vehicle defined in claim 2 including an extended support surface formed by the rear support surface cooperating with the front support surface when the rear seat bottom is removed.

4. The passenger vehicle defined in claim 3 wherein the rear support surface is approximately level with the trunk support surface.

5. The passenger vehicle defined in claim 4 wherein the front support surface is provided at a predetermined height to cooperate with the rear and trunk support surfaces to support an item extending from the trunk compartment into the passenger compartment.

6. The passenger vehicle defined in claim 1 wherein the rear seat bottom is divided into a first portion and a second seat portion, wherein at least one of the portions is removable from the passenger compartment.

7. The passenger vehicle defined in claim 1 wherein the rear seat back is divided into a first panel and a second panel, wherein at least one of the panels is forwardly foldable.

8. The passenger vehicle defined in claim 1 wherein the rear seat bottom is pivotable along a front edge to an upright position.

9. The passenger vehicle defined in claim 1 wherein a storage compartment is provided beneath the rear seat bottom.

10. The passenger vehicle defined in claim 1 wherein a workstation is formed in the front support surface.

11. The passenger vehicle defined in claim 10 wherein the workstation is oriented to accommodate use by an occupant of a front driver seat.

12. The passenger vehicle defined in claim 10 wherein the workstation is oriented to accommodate use by an occupant of the rear seat.

13. A seat system for a passenger vehicle comprising:
   a rear seat having a seat bottom, a forwardly folding seat back, and a frame assembly having a head panel that frames an opening into a trunk compartment;
   an approximately horizontal rear support surface formed by a surface of the rear seat back when the rear seat back is folded forward;
   a foldable front seat having a seat bottom and a forwardly folding seat back; and
   an approximately horizontal front support surface formed by a surface of the front seat back when the front seat back is folded forward.

14. The seat system defined in claim 13 wherein an extended support surface is formed by the rear support surface and the front support surface.

15. The seat system defined in claim 13 wherein the front seat is mounted on a track assembly to permit the front seat to be moved in close proximity to the folded rear seat panel.

16. The seat system defined in claim 13 wherein the rear seat bottom is pivotable along a front edge.

17. The seat system defined in claim 16 wherein a dual pivoting linkage pivotally connects the rear seat bottom to a shell.

18. A method of forming an extended support surface in a passenger vehicle having a passenger compartment and a trunk compartment, the trunk compartment including a trunk support surface, the method comprising the steps of:

mounting a rear seat in the passenger compartment adjacent the trunk compartment, the rear seat including a seat bottom, a forwardly folding seat back, and a frame assembly having a head panel that frames an opening into the trunk compartment;

mounting a front seat in the passenger compartment forward of the rear seat, the front seat including a seat bottom and a forwardly folding seat back;

folding the rear seat back forwardly to provide a rear support surface cooperating with the trunk support surface; and folding the front seat back forward to provide a front support surface cooperating with the rear support surface.

19. The method defined in claim 18 including the steps of mounting the front seat on a track assembly; and sliding the folded front seat adjacent the folded rear seat so that the front support surface is in close proximity to the rear support surface.

20. The method defined in claim 18 including the step of removing the rear seat bottom to provide an extended support surface including the rear support surface and the front support surface.

* * * * *